US007058501B2

(12) United States Patent
Yasui et al.

(10) Patent No.: US 7,058,501 B2
(45) Date of Patent: Jun. 6, 2006

(54) CONTROL APPARATUS FOR CONTROLLING A PLANT BY USING A DELTA-SIGMA MODULATION

(75) Inventors: Yuji Yasui, Saitama (JP); Masahiro Sato, Saitama (JP)

(73) Assignee: Honda Motor Co. Ltd., Tokyo (JP)

( * ) Notice: Subject to any disclaimer, the term of this patent is extended or adjusted under 35 U.S.C. 154(b) by 90 days.

(21) Appl. No.: 10/947,341

(22) Filed: Sep. 23, 2004

(65) Prior Publication Data

US 2005/0075780 A1 Apr. 7, 2005

(30) Foreign Application Priority Data

Oct. 3, 2003 (JP) ............................. 2003-346234

(51) Int. Cl.
*F02D 41/14* (2006.01)
*G05B 13/04* (2006.01)

(52) U.S. Cl. ......................... 701/102; 701/109; 700/29

(58) Field of Classification Search ..................... None
See application file for complete search history.

(56) References Cited

U.S. PATENT DOCUMENTS

2003/0125865 A1 * 7/2003 Yasui ......................... 701/109

FOREIGN PATENT DOCUMENTS

JP 2003-195908 7/2003

* cited by examiner

*Primary Examiner*—Andrew M. Dolinar
(74) *Attorney, Agent, or Firm*—Arent Fox PLLC

(57) ABSTRACT

A control apparatus for controlling an object that is modeled using at least one model parameter is provided. The control apparatus comprises an identifier, a controller and a modulator. The identifier identifies the model parameter. The controller is coupled to the identifier and uses the model parameter to determine a reference input so that an output of the object converges to a desired value. The modulator is coupled to the controller and applies any one of a delta-sigma modulation algorithm, a sigma-delta modulation algorithm and a delta modulation algorithm to the reference input to determine an input into the object. The model parameter is identified based on the output of the object and the reference input. Since the identifier determines the model parameter based on the reference input, the model parameters is prevented from vibrating.

21 Claims, 16 Drawing Sheets

(a)

(b)

CONTROL APPARATUS FOR CONTROLLING A PLANT BY USING A DELTA-SIGMA MODULATION

BACKGROUND OF THE INVENTION

The present invention relates to an apparatus for controlling a plant with desirable accuracy by using a delta-sigma (ΔΣ) modulation algorithm.

As shown in Japanese Patent Unexamined Application Publication No. 20003-195908, a scheme of controlling a plant by using a delta-sigma modulation algorithm (or a sigma-delta modulation algorithm or a delta modulation algorithm) is known. As long as the plant is capable of generating an appropriate control output in response to a control input switched between "on" and "off", the plant can be controlled with desirable accuracy by using the delta-sigma modulation algorithm.

FIG. 18 shows a block diagram of a typical controller in which a delta-sigma modulation algorithm is used. A plant 101, which is a controlled object, is modeled by using model parameters. An identifier 102 recursively identifies the model parameters based on a control input and a control output of the controlled object 101. A state predictor 103 takes into account a dead time included in the controlled object 101 to generate a predicted value for the control output by using the model parameters. The predicted value is compared with a desired value. An amplifier 104 amplifies an error between the predicted value and the desired value to output a reference input. A controller 105 applies the delta-sigma modulation algorithm to the reference input to calculate a control input to be input to the controlled object 101.

The state predictor generates the predicted value for the control output of the controlled object so as to compensate for the dead time included in the controlled object. When the controlled object has no dead time, the state predictor is not required. If the state predictor does not exist, the model parameters identified by the identifier are not reflected in the control input. As a result, the control accuracy may deteriorate.

Therefore, there exists a need for a control apparatus capable of controlling a controlled object having no dead time with desirable accuracy by using a delta-sigma modulation algorithm.

Output signal from the controller that uses the delta-sigma modulation algorithm is a square wave. When the model parameters are identified by using such a square wave signal, the model parameters may tend to vibrate. Such vibration of the model parameters may cause instability in the control system.

Therefore, there also exists a need for a controller of preventing model parameters from vibrating in the control using a delta-sigma modulation algorithm.

SUMMARY OF THE INVENTION

According to one aspect of the invention, a control apparatus for controlling an object that is modeled using at least one model parameter is provided. The control apparatus comprises an identifier, a controller and a modulator. The identifier identifies the model parameter. The controller is coupled to the identifier and uses the model parameter to determine a reference input so that an output of the object converges to a desired value. The modulator is coupled to the controller and applies any one of a delta-sigma modulation algorithm, a sigma-delta modulation algorithm and a delta modulation algorithm to the reference input to determine an input into the object. The model parameter is identified based on the output of the object and the reference input.

According to the invention, the model parameter identified by the identifier is passed to the controller, which uses the model parameter to determine the reference input so that the output of the controlled object converges to a desired value. The input into the controlled object is determined by applying the delta-sigma modulation algorithm (or the delta-sigma modulation algorithm or the delta modulation algorithm) to the reference input. Thus, the model parameter that is identified to be adapted to the behavior of the controlled object is reflected in the control input into the controlled object. Furthermore, since the identifier determines the model parameter based on the reference input, the model parameter is prevented from vibrating.

According to one embodiment of the present invention, at least two model parameters are used to model the object. The model parameters include a first model parameter that is pre-identified and a second model parameter that is recursively identified by the identifier. A virtual plant is configured to include the controlled object and components that are associated with the first model parameter. The virtual plant is modeled using the second model parameter. The identifier identifies the second model parameter so that an actual output of the virtual plant converges to an output of the virtual plant modeled using the second model parameter. Configuration of such a virtual plant reduces the number of model parameters to be identified, which decreases the time required for causing the model parameter to converge to an optimal value.

According to another embodiment of the present invention, a model parameter representing disturbance that is applied to the controlled object is used to model the object. The identifier identifies the model parameter representing the disturbance based on the output of the controlled object and the reference input. Since the identifier determines the model parameter representing the disturbance based on the reference input, the model parameter representing the disturbance is prevented from vibrating.

According to another embodiment of the present invention, at least two model parameters are used to model the object. The model parameters include a first model parameter that is pre-identified corresponding to a predetermined parameter and a second model parameter that is recursively identified by the identifier. The control apparatus further includes a parameter scheduler for holding the pre-identified first model parameter. If the predetermined parameter is received, the parameter scheduler determines the value of the first model parameter corresponding to the received predetermined parameter. According to the invention, the model parameter that may be influenced by the behavior of the controlled object can be recursively identified by the identifier. As to the model parameter that may be less influenced by the behavior of the controlled object, the pre-identified value can be held in the parameter scheduler. Such a scheme of determining the model parameters can accelerate the speed for identifying the model parameters without influence upon the behavior of the control system.

According to another embodiment of the invention, the controller determines the reference input by using a 2-degree-of-freedom response assignment control algorithm. By using the control algorithm, convergence of the control output against disturbance and characteristic that the control output follows a desired value can be specified separately. According to the control algorithm, the output of the controlled object can converge to the desired value with a specified speed without overshooting.

According to another embodiment of the invention, the controlled object is a variable-phase device for variably controlling a phase of a camshaft of an engine. In this case, the control input into the controlled object is a command, which is provided to the variable-phase device. The control output of the controlled object is a phase of the camshaft. According to the invention, since the phase of the camshaft converges to a desired value with desirable accuracy and without overshooting, drivability and fuel efficiency can be improved.

According to another embodiment of the invention, the controlled object is a system extending from an engine to an exhaust gas sensor. In this case, the control input is a parameter associated with fuel to be supplied to the engine (for example, a fuel correction coefficient) and the control output is an output from the exhaust gas sensor. According to the invention, since the output of the exhaust gas sensor converges to a desired value with desirable accuracy and without overshooting, undesired substances of the exhaust gas can be reduced.

DESCRIPTION OF THE PREFERRED EMBODIMENTS

Structure of an Internal-Combustion Engine and a Control Unit

Figure 1:
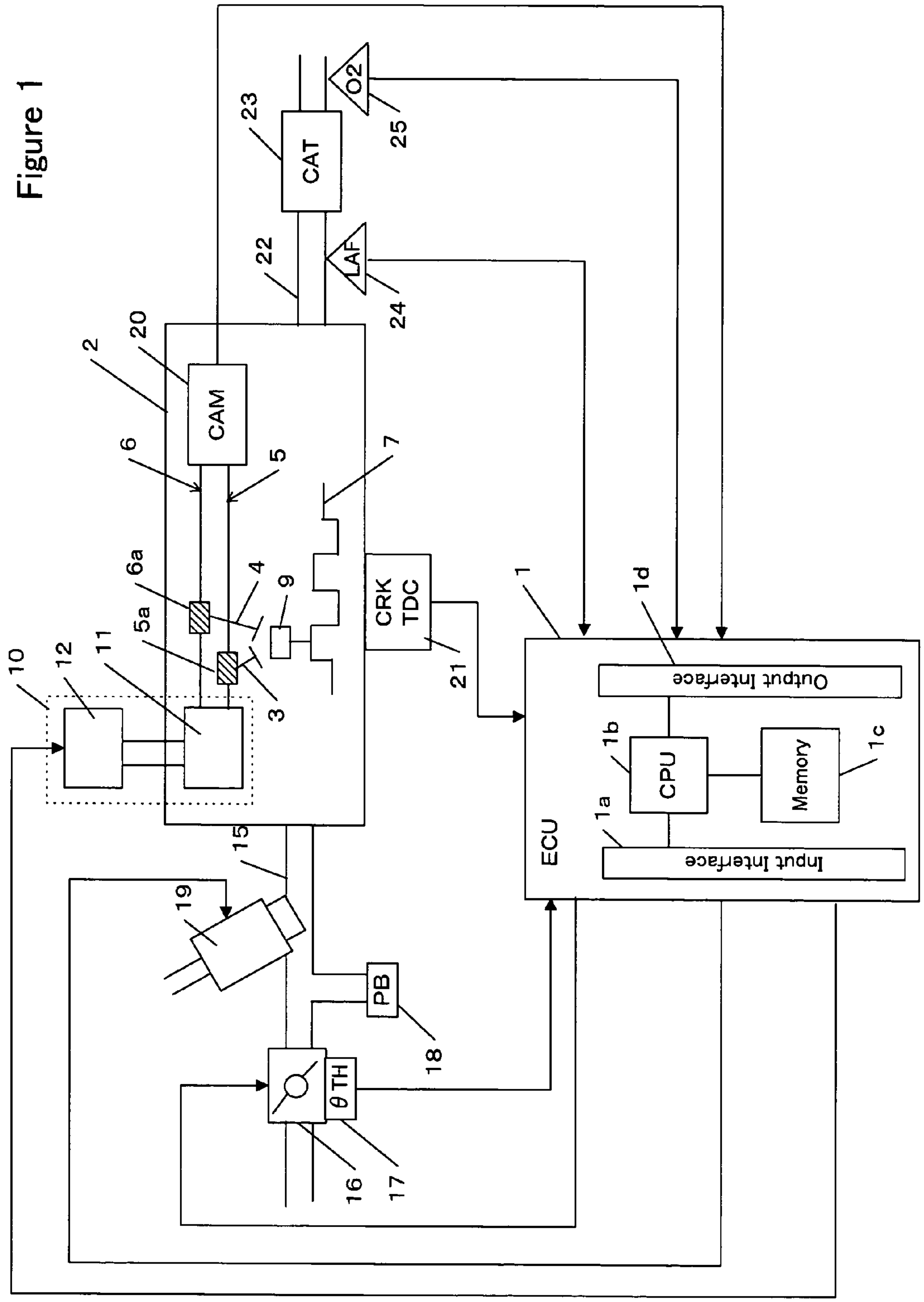
FIG. 1 is a schematic diagram of an engine and its control unit in accordance with one embodiment of the present invention.

Referring to the drawings, specific embodiments of the invention will be described. FIG. 1 is a block diagram showing an internal combustion engine (hereinafter referred to as an engine) and a control unit for the engine in accordance with one embodiment of the invention.

An electronic control unit (hereinafter referred to as an ECU) 1 comprises an input interface 1*a* for receiving data sent from each part of the vehicle, a CPU 1*b* for carrying out operations for controlling each part of the vehicle, a memory 1*c* including a read only memory (ROM) and a random access memory (RAM), and an output interface 1*d* for sending control signals to each part of the vehicle. Programs and various data for controlling each part of the vehicle are stored in the ROM. Programs and data for implementing a control in accordance with the invention are stored in the ROM. The ROM may be a rewritable ROM such as an EPROM. The RAM provides work areas for operations by the CPU 1*b*, in which data sent from each part of the vehicle as well as control signals to be sent out to each part of the vehicle are temporarily stored.

An engine 2 is, for example, a 4-cycle, DOHC gasoline engine. The engine 2 comprises an intake camshaft 5 and an exhaust camshaft 6. The intake camshaft 5 has an intake cam 5*a* for driving an intake valve 3 to open and close. The exhaust camshaft 6 has an exhaust cam 6*a* for driving an exhaust valve 4 to open and close. These intake and exhaust camshafts 5 and 6 are connected to a crankshaft 7 via a timing belt (not shown). These camshafts rotate once for every two rotations of the crankshaft 7.

A continuously-variable-phase device (hereinafter referred to as a "phase device") 10 has a continuously-variable-phase mechanism (hereinafter referred to as a "phase mechanism") 11 and a hydraulic driving unit 12. The hydraulic driving unit 12 drives the phase mechanism 11 with a hydraulic pressure in accordance with a command value supplied by the ECU 1. In doing so, an actual phase CAIN of the intake cam 5*a* can continuously advance or retard with respect to the crankshaft 7. The phase device 10 will be described in detail later referring to FIG. 2.

A cam angle sensor 20 is disposed at an end portion of the intake camshaft 5. As the intake camshaft 5 rotates, the cam angle sensor 20 outputs to the ECU 1 a CAM signal, which is a pulse signal, at every predetermined cam angle (for example, for every one degree).

A throttle valve 16 is disposed in an intake manifold 15 of the engine 2. An opening degree of the throttle valve 16 is controlled by a control signal from the ECU 1. A throttle valve opening sensor (θTH) 17, which is connected to the throttle valve 16, supplies the ECU 1 with an electric signal corresponding to the opening angle of the throttle valve 16.

An intake manifold pressure (Pb) sensor 18 is disposed downstream of the throttle valve 16. The intake manifold pressure Pb detected by the Pb sensor 18 is sent to the ECU 1.

A fuel injection valve 19 is provided, for each cylinder, in the intake manifold 15. The fuel injection valve 19 is supplied with fuel from a fuel tank (not shown) to inject the fuel in accordance with a control signal from the ECU 1.

A crank angle sensor 21 is disposed in the engine 2. The crank angle sensor 21 outputs a CRK signal and a TDC signal, which are pulse signals, to the ECU 1 in accordance with the rotation of the crankshaft 7.

The CRK signal is a pulse signal that is output at every predetermined crank angle (for example, 30 degrees). The ECU 1 calculates a rotational speed NE of the engine 2 in accordance with the CRK signal. The ECU 1 also calculates a phase CAIN based on the CRK signal and the CAM signal. The TDC signal is also a pulse signal that is output at a crank angle associated with a TDC position of a piston 9.

An exhaust manifold 22 is connected on the downstream side of the engine 2. The engine 2 emits exhaust gas through the exhaust manifold 22. A catalytic converter 23, which is disposed in the exhaust manifold 22, purifies undesirable elements such as HC, CO, NOx contained in the exhaust gas.

A wide-range air/fuel ratio (LAF) sensor 24 is disposed upstream of the catalytic converter 23. The LAF sensor 24 detects an air/fuel ratio over a wide range extending from rich to lean. The detected air/fuel ratio is sent to the ECU 1.

An O2 (exhaust gas) sensor 25 is disposed downstream of the catalyst converter. The O2 sensor 25 is a binary-type of exhaust gas concentration sensor. The O2 sensor outputs a high level signal when the air-fuel ratio is richer than the stoichiometric air-fuel ratio, and outputs a low level signal when the air-fuel ratio is leaner than the stoichiometric air-fuel ratio. The electric signal is sent to the ECU 1.

Signals sent to the ECU 1 are passed to the input interface 1*a*. The input interface 5*a* converts analog signal values into digital signal values. The CPU 1*b* processes the resulting digital signals, performs operations in accordance with the programs stored in the memory 1*c*, and creates control signals. The output interface 1*d* sends these control signals to actuators for the throttle valve 16, hydraulic driving unit 12, fuel injection valve 19 and other mechanical components.

Continuously-Variable-Phase Device

One embodiment in accordance with the present invention will be described. In the embodiment, the controlled object is a phase device. However, a control scheme in accordance with the present invention can be applied to other controlled objects.

Figure 2:
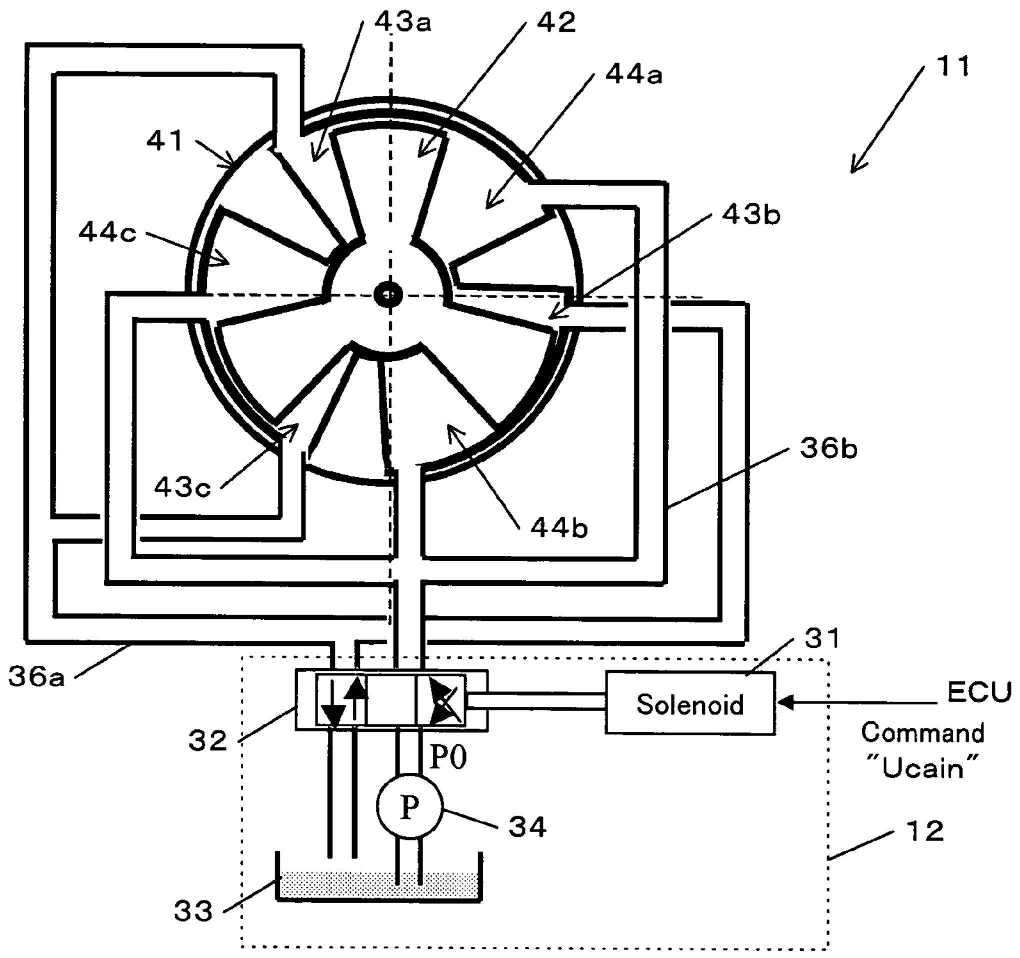
FIG. 2 is a block diagram of a continuously-variable-phase device in accordance with one embodiment of the present invention.

FIG. 2 shows an example of the phase device 10 shown in FIG. 1. The phase device 10 has the phase mechanism 11 and the hydraulic driving unit 12 as described above.

A command value Ucain is supplied from the ECU 1 to a solenoid 31. The solenoid 31 is energized in accordance with the command value Ucain, and then a hydraulic spool valve 32 is driven by the solenoid 31. The hydraulic spool valve 32 controls the flow of hydraulic fluid from a tank 33 through a pump 34 to the phase mechanism 11.

The hydraulic spool valve 32 is connected to the phase mechanism 11 through an advance oil passage 36*a* and a retard oil passage 36*b*. A hydraulic pressure OP1 of the hydraulic fluid to be supplied to the advance oil passage 36*a* and a hydraulic pressure OP2 of the hydraulic fluid to be supplied to the retard oil passage 36*b* are controlled through the hydraulic spool valve 32 in accordance with the command value Ucain.

The phase mechanism 11 comprises a housing 41 and a vane 42. The housing 41 is connected to the crankshaft 7 through a sprocket and a timing belt (both not shown). The housing 41 rotates in the same direction as the rotation of the crankshaft 7.

The vane 42 extends radially from the intake camshaft 5 that is inserted into the housing 41. The vane 42 is accommodated in the housing 41 in such a manner that it can rotate relative to the housing 41 within a predetermined range. The fan-shaped space formed in the housing 41 is partitioned into three advance chambers 43*a*, 43*b* and 43*c* and three retard chambers 44*a*, 44*b* and 44*c* by the vane 42. The advance passage 36*a* is connected to the three advance chambers 43*a* to 43*c*. The hydraulic fluid of the hydraulic pressure OP1 is supplied to the advance chambers 43*a* to 43*c* through the advance passage 36*a*. The retard passage 36*b* is connected to three retard chambers 44*a* to 44*c*. The hydraulic fluid of the hydraulic pressure OP2 is supplied to the retard chambers 44*a* to 44*c* through the retard passage 36*b*.

When a difference between the hydraulic pressure OP1 and the hydraulic pressure OP2 is zero, the vane 42 does not rotate relative to the housing 41, so that the value of the phase CAIN is maintained. When the hydraulic pressure OP1 becomes larger than the hydraulic pressure OP2 in accordance with the command value Ucain from the ECU 1, the vane 42 rotates in the advance direction relative to the housing 41, so that the phase CAIN advances. When the hydraulic pressure OP2 becomes larger than the hydraulic pressure OP1 in accordance with the command value Ucain from the ECU 1, the vane 42 rotates in the retard direction relative to the housing 41, so that the phase CAIN retards.

In such a phase device, variations may occur in the hydraulic fluid out of the pump. The viscosity of the hydraulic fluid may change. The space between the vane and the housing may change with time. These conditions may change the behavior of the phase device. It is preferable to control the phase CAIN so that the phase CAIN converges to a desired value robustly against such changes of the behavior of the phase device.

The phase CAIN changes non-linearly against the change in the hydraulic pressure. A control using the delta-sigma modulation algorithm is effective to a system having such non-linear characteristics.

Structure of a Control Apparatus

Figure 3:
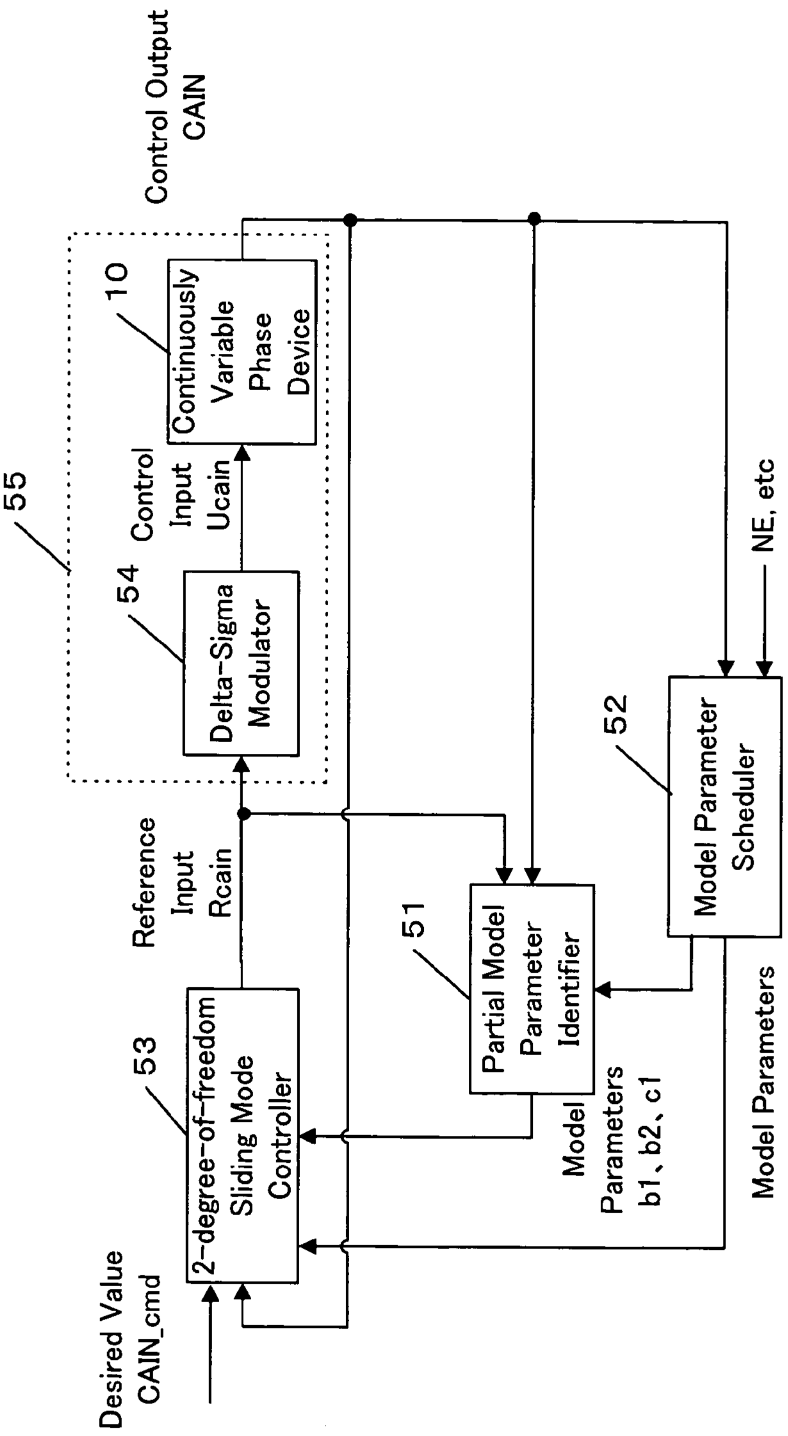
FIG. 3 shows a block diagram of a control apparatus in accordance with one embodiment of the present invention.

FIG. 3 shows a block diagram of a control apparatus for controlling the phase device 10 in accordance with one embodiment of the present invention.

As described above, the control input Ucain to the phase device 10, which is a controlled object, is a command value for driving the solenoid 31. The control output CAIN is an actual phase of the intake cam 5*a* relative to the crankshaft 7.

Equation (1) shows a model expression of the phase device 10. As seen from the equation (1), the phase device 10 is expressed as a system having no dead time.

$$\mathrm{CAIN}(k+1)=a\mathbf{1}\cdot \mathrm{CAIN}(k)+a\mathbf{2}\cdot \mathrm{CAIN}(k-1)+b\mathbf{1}\cdot Ucain(k)+b\mathbf{2}\cdot Ucain(k-1) \tag{1}$$

A disturbance may be applied to the phase device 10. Assuming that such disturbance is represented by c1, the model expression of the equation (1) is expressed by the equation (2). "c1" may be referred to as an estimated disturbance value.

$$CAIN(k+1)=a1\cdot CAIN(k)+a2\cdot CAIN(k-1)+b1\cdot Ucain(k)+b2\cdot Ucain(k-1)+c1 \quad (2)$$

The influence by the behavior of the phase device 10 on the model parameters b1, b2 and c1 is larger than the influence on the model parameters a1 and a2. Therefore, the model parameters b1, b2 and c1 are recursively identified by a partial model parameter identifier 51 so that modeling errors are eliminated. On the other hand, the model parameters a1 and a2 are pre-identified. A relationship between the model parameters a1 and a2 and operating conditions of the engine (for example, the engine rotational speed NE) may be stored as a map in the memory 1*c*. The model parameter scheduler 52 refers to the map based on detected operating conditions of the engine to extract the values of the model parameters a1 and a2. Alternatively, the model parameter scheduler may hold such a map.

Thus, since the number of the model parameters to be recursively identified by the identifier is reduced, the time required for causing the model parameters to converge to desired values can be shortened. The complexity of the identification can be reduced.

The partial model parameter identifier 51 and the model parameter scheduler 52 are connected to a 2-degree-of-freedom sliding mode controller (hereinafter referred to as a "sliding mode controller") 53. A system 55 containing a delta-sigma modulator 54 and the phase device 10 is a controlled object of the sliding mode controller 53. The sliding mode controller 53 uses the model parameters a1 to c1 received from the partial model parameter identifier 51 and the model parameter scheduler 52 to calculate the reference input Rcain so that the control output CAIN converges to a desired value CAIN_cmd (more specifically, so that the control output CAIN converges to CAIN_cmd_f that is derived from the desired value CAIN_cmd, which will be described later).

The delta-sigma modulator 54 applies the delta-sigma modulation algorithm to the reference input Rcain received from the sliding mode controller 53, to calculate the control input Ucain. The control input Ucain is applied to the phase device 10.

Because the partial model parameter identifier 51 and the model parameter scheduler 52 are connected to the sliding mode controller 53, the identification result is reflected in the reference input Rcain and hence reflected in the control input Ucain. Thus, even when a system having no dead time is controlled, the identification result can be reflected in the control input. Since the identification result can be reflected in the control input, the controlled object can be controlled with desirable accuracy and without modeling errors.

Figure 18:
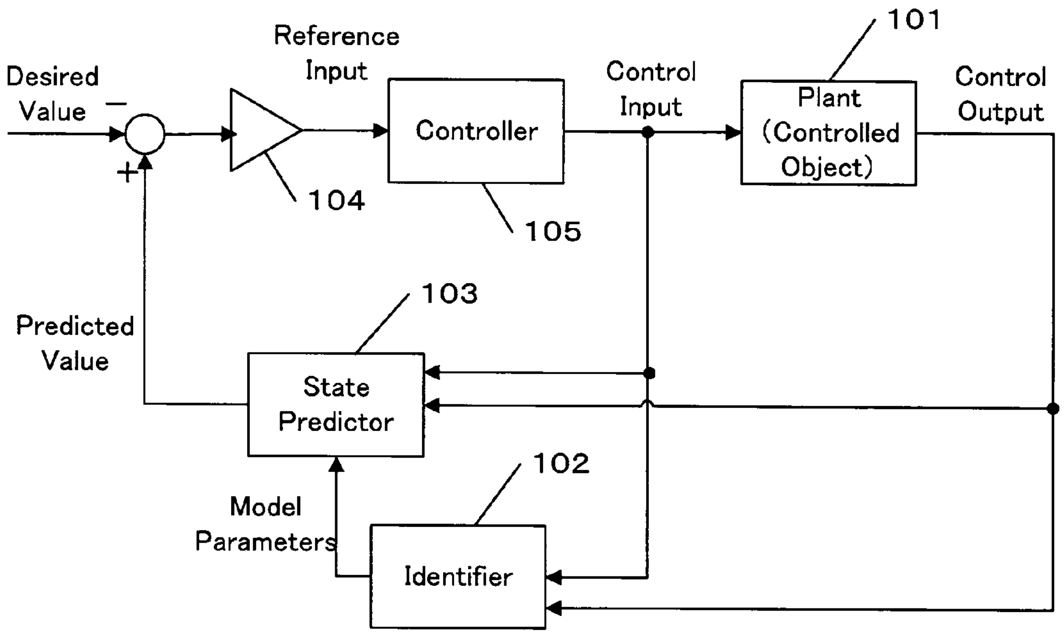
FIG. 18 shows a typical block diagram of a control apparatus for controlling an object having a dead time in accordance with a conventional scheme.

It should be noted that the reference input Rcain is input into the partial model parameter identifier 51. As described referring to FIG. 18, the output of the delta-sigma modulator (that is, the output of the controller 105) is conventionally input into the identifier 102. According to the present invention, the input into the delta-sigma modulator (that is, the reference input Rcain) is input into the identifier 51. This leads to some advantages as follows.

Figure 4:
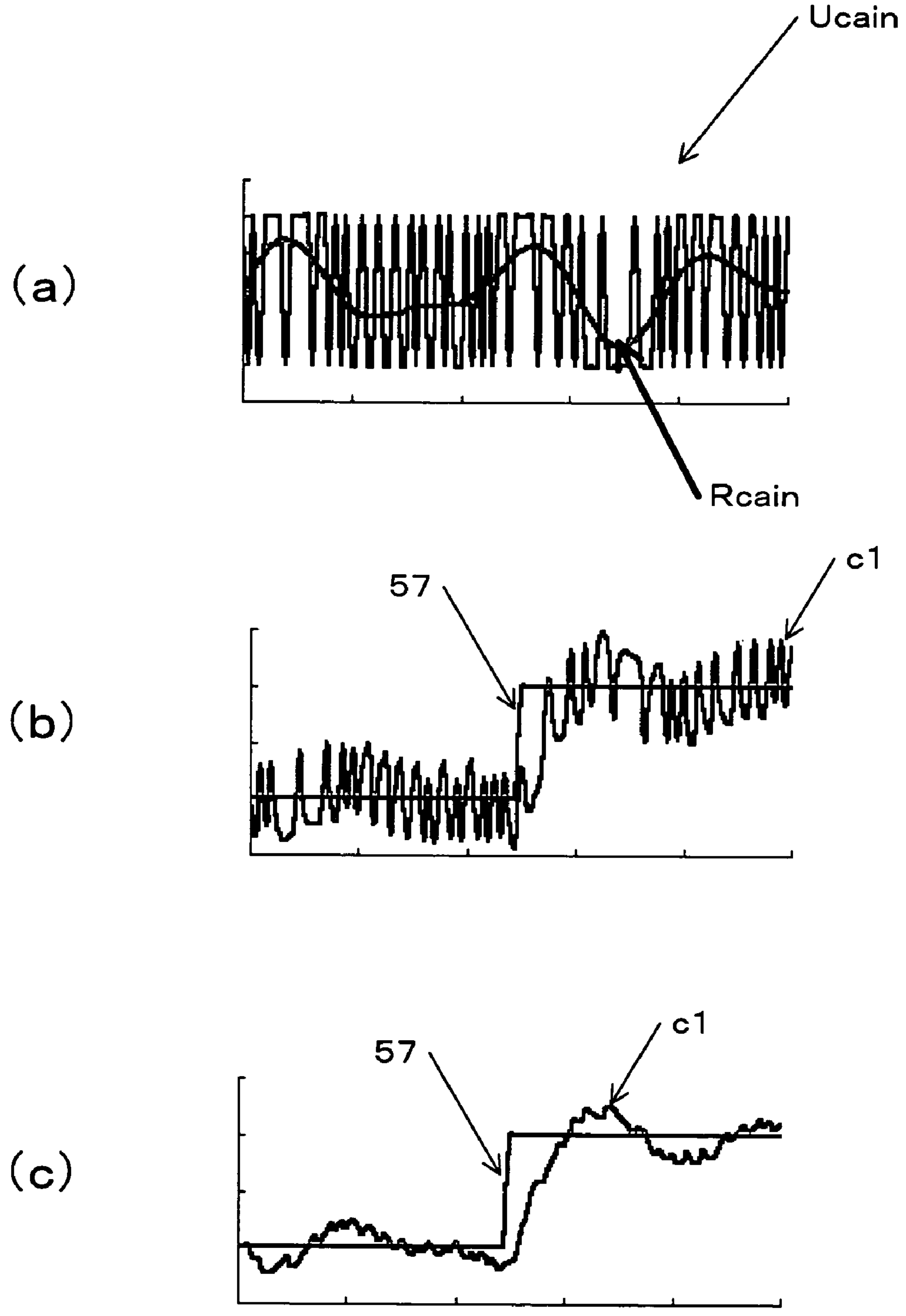
FIG. 4 shows an effect of suppressing vibrations in a model parameter by a control scheme in accordance with one embodiment of the present invention.

As shown in FIG. 4(*a*), the delta-sigma modulator 54 generates based on the reference input Rcain a modulation signal Ucain that changes between positive and negative. A method for generating the modulation signal Ucain by the delta-sigma modulator 54 will be described later.

If the model parameters are identified based on such changing modulation signal Ucain, variations appear in the estimated disturbance value c1 . For a comparison purpose, an actual disturbance is shown by a reference number 57 in FIG. 4. It is seen that the estimated disturbance value c1 vibrates relative to the actual disturbance 57. Since the sliding mode controller 53 uses the estimated disturbance value c1 to calculate the reference input Rcain, variations may appear in the reference input Rcain, which may cause vibrations in the control output CAIN. This may cause instability in the control system and hence produce resonance in the control system.

As to model parameters b1 and b2, similar vibrations as shown in FIG. 4(*b*) may occur.

According to the present invention, the reference input Rcain is input into the partial model parameter identifier 51. Since the reference input Rcain does not exhibit vibrations as shown in FIG. 4(*a*), the estimated disturbance value c1 calculated by the identifier 51 is prevented from vibrating. FIG. 4(*c*) shows an estimated disturbance value c1 that is calculated based on the reference input Rcain. As seen from comparison with FIG. 4(*b*), the vibrations appearing in the estimated disturbance value c1 are suppressed. Vibrations appearing in the other model parameters b1 and b2 are similarly suppressed.

Thus, according to the present invention, vibrations in the model parameters can be prevented because the partial model parameter identifier 51 identifies the model parameters by using the input Rcain into the delta-sigma modulator 54. The occurrence of vibrations in the control output CAIN can be suppressed. Since the input Rcain into the delta-sigma modulator 54 is connected to the partial model parameter identifier 51, the sliding mode controller 53 is configured to control the system 55 containing both of the delta-sigma modulator 54 and the phase device 10, as described above. According to such configuration, the consistency of the control system as shown in FIG. 3 can be maintained.

In the embodiment, the model parameters a1 and a2 are calculated based on the operating conditions of the engine by the model parameter scheduler 52. Alternatively, the model parameters a1 and a2 may be fixed to predetermined values.

Now, each of the blocks shown in FIG. 3 will be described below.

The sliding mode controller 53 calculates the reference input Rcain using a 2-degree-of-freedom sliding mode control. A sliding mode control is a response assignment control that is capable of specifying a convergence speed of a controlled variable. The 2-degree-of-freedom sliding mode control is an extended version of the sliding mode control. According to the 2-degree-of-freedom sliding mode control, a speed that a controlled variable follows a desired value and a speed that the controlled variable converges when disturbance is applied can be separately specified.

As shown in the equation (3), the sliding mode controller 53 uses a desired value response assignment parameter POLE_f to apply a first-order delay filter (a low-pass filter) to the desired value CAIN_cmd. The desired value response assignment parameter POLE_f defines the speed that the controlled variable follows the desired value. It is set to satisfy $-1<POLE\_f<0$.

$$CAIN\_cmd\_f(k)=-POLE\_f\cdot CAIN\_cmd\_f(k-1)+(1+POLE\_f)\cdot CAIN\_cmd(k) \quad (3)$$

As shown in the equation (3), the trajectory of the desired value CAIN_cmd_f is specified by the desired value response assignment parameter POLE_f. The speed that the controlled variable follows the desired value can be specified in accordance with what trajectory is set for the desired value. The sliding mode controller 53 calculates the reference input Rcain so that the controlled variable CAIN converges to the desired value CAIN_cmd_f thus established.

The sliding mode controller 53 defines a switching function σ as shown in the equation (4). Ecain is an error between the actual phase CAIN and the desired value CAIN_cmd_f. The switching function σ specifies a convergence behavior of the error. POLE is a response assignment parameter for suppressing disturbance. The converging speed of the error Ecain when disturbance is applied is determined by the response assignment parameter POLE. The response assignment parameter POLE is set to satisfy $-1<POLE<0$.

$$\sigma(k)=Ecain(k)+POLE\cdot Ecain(k-1) \tag{4}$$

where $Ecain(k)=CAIN(k)-CAIN\_cmd\_f(k-1)$.

As shown in the equation (5), the sliding mode controller 53 calculates the control input so that the switching function σ becomes zero.

$$\sigma(k)=0$$

$$\Downarrow$$

$$Ecain(k)=-POLE\cdot Ecain(k-1) \tag{5}$$

The equation (5) represents a first-order delay system having no input. In other words, the sliding mode controller 53 controls the error Ecain so that the error Ecain is confined within the first-order delay system shown in the equation (5).

Figure 5:
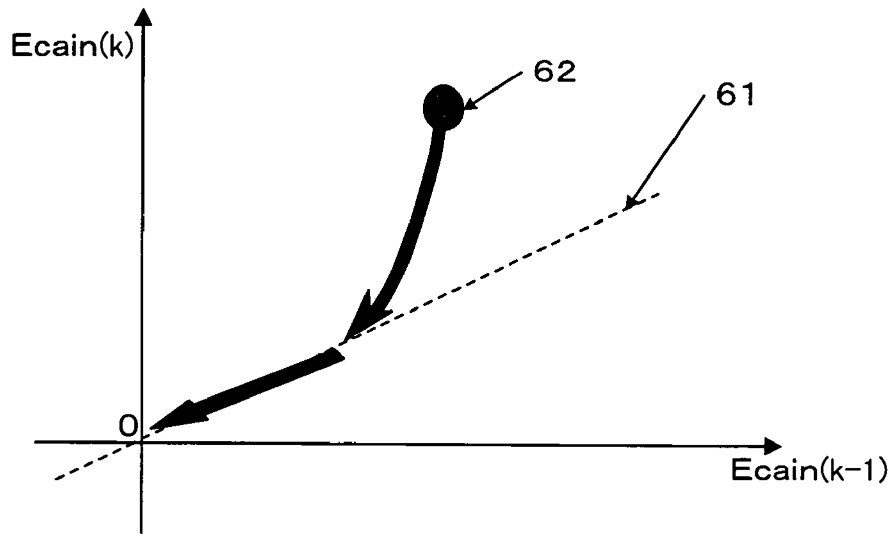
FIG. 5 shows a switching function of a sliding mode control in accordance with one embodiment of the present invention.

FIG. 5 shows a phase plane with Ecain(k) on the vertical axis and Ecain(k−1) on the horizontal axis. A switching line 61 expressed by the equation (5) is shown in the phase plane. Assuming that a point 62 is an initial value of a state quantity (Ecain(k−1), Ecain(k)), the sliding mode controller 53 places the state quantity on the switching line 61 and then constrains it on the switching line 61. Thus, the state quantity automatically converges to the origin (that is, Ecain (k) and Ecain (k−1)=0) of the phase plane with time because the state quantity is confined within the first-order delay system having no input. By constraining the state quantity on the switching line 61, the state quantity can converge to the origin without being influenced by disturbance.

Figure 6:
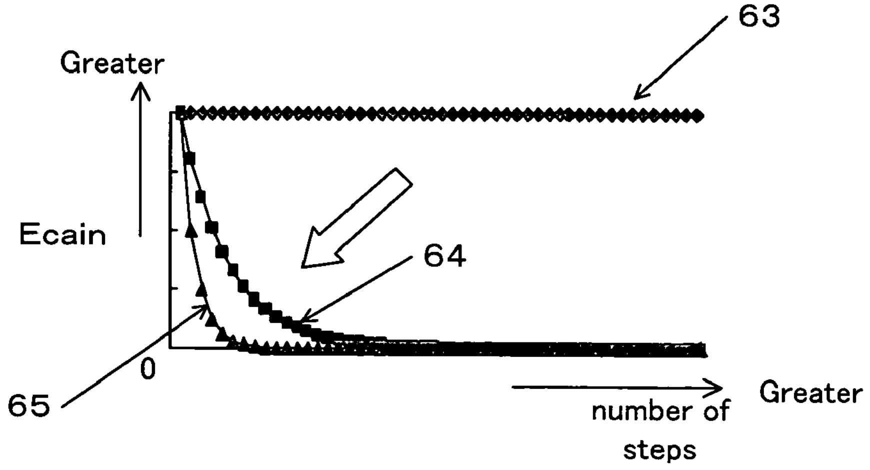
FIG. 6 shows a response assignment parameter of a sliding mode control in accordance with one embodiment of the present invention.

FIG. 6 shows an example of the convergence speed of the error Ecain. Reference number 63 shows a case where the response assignment parameter POLE for suppressing disturbance takes a value of −1. Reference number 64 shows a case where POLE takes a value of −0.8. Reference number 65 shows a case where POLE takes a value of −0.5. As the absolute value of POLE becomes smaller, the convergence speed of the error Ecain becomes faster.

The sliding mode controller 53 calculates the reference input Rcain in accordance with the equation (6). Req is an equivalent control input for constraining the state quantity on the switching line. Rrch is a reaching law input for placing the state quantity on the switching straight line.

$$Rcain(k)=Req(k)+Rrch(k) \tag{6}$$

A method for calculating the equivalent control input Req will be described. Since the equivalent control input Req has a function of holding the state quantity at any location in the phase plane, the equation (7) needs to be satisfied.

$$\sigma(k)=\sigma(k-1) \tag{7}$$

Based on the equation (7) and the above model expression (2), the equivalent control input Req is calculated as shown in the equation (8).

$$\begin{aligned}Req(k) = \frac{1}{b1(k)}\{&(1-POLE-a1(k))\cdot CAIN(k) + \\ &(POLE-a2(k))\cdot CAIN(k-1) - b2(k)\cdot Ucain(k-1) - \\ &c1(k) + \mathrm{CAIN\_cmd\_f}(k) + \\ &(POLE-1)\cdot \mathrm{CAIN\_cmd\_f}(k-1) - \\ &POLE\cdot \mathrm{CAIN\_cmd\_f}(k-2)\}\end{aligned} \tag{8}$$

The reaching law input Rrch is calculated in accordance with the equation (9). Krch indicates a feedback gain. The value of the feedback gain Krch is pre-identified through a simulation or the like taking into account the stability, quick responsiveness etc. of the controlled variable.

$$Rrch(k) = \frac{-Krch}{b1(k)}\sigma(k) \tag{9}$$

Next, an identification algorithm implemented by the partial model parameter identifier 52 will be described. The partial model parameter identifier 52 identifies the model parameters b1, b2 and c1 of the above equation (2).

In order to perform the partial identification, a virtual plant is constructed. A method for constructing the virtual plant will be described.

The equation (2) is shifted by one step to the past (equation (10)). The model parameters b1(*k*), b2(*k*) and c1(*k*) that are to be identified in the current cycle are substituted into the shifted equation (equation (11)). The model parameters that are to be identified are collected in the right-hand side of the equation (equation (12)).

$$CAIN(k+1)=a1\cdot CAIN(k)+a2\cdot CAIN(k-1)+b1\cdot Ucain(k)+b2\cdot Ucain(k-1)+c1 \tag{2}$$

$$\Downarrow$$

$$CAIN(k)=a1\cdot CAIN(k-1)+a2\cdot CAIN(k-2)+b1\cdot Ucain(k-1)+b2\cdot Ucain(k-2)+c1 \tag{10}$$

$$\Downarrow$$

$$CAIN(k)=a1\cdot CAIN(k-1)+a2\cdot CAIN(k-2)+b1(k)\cdot Ucain(k-1)+b2(k)\cdot Ucain(k-2)+c1(k) \tag{11}$$

$$\Downarrow$$

$$CAIN(k)-a1\cdot CAIN(k-1)-a2\cdot CAIN(k-2)=b1(k)\cdot Ucain(k-1)+b2(k)\cdot Ucain(k-2)+c1(k) \tag{12}$$

The left-hand side of the equation (12) is represented by W(k) and the right-hand side by W_hat(k).

$$W(k)=CAIN(k)-a1\cdot CAIN(k-1)-a2\cdot CAIN(k-2) \tag{13}$$

$$W\_hat(k)=b1(k)\cdot Ucain(k-1)+b2(k)\cdot Ucain(k-2)+c1(k) \tag{14}$$

Figure 7:
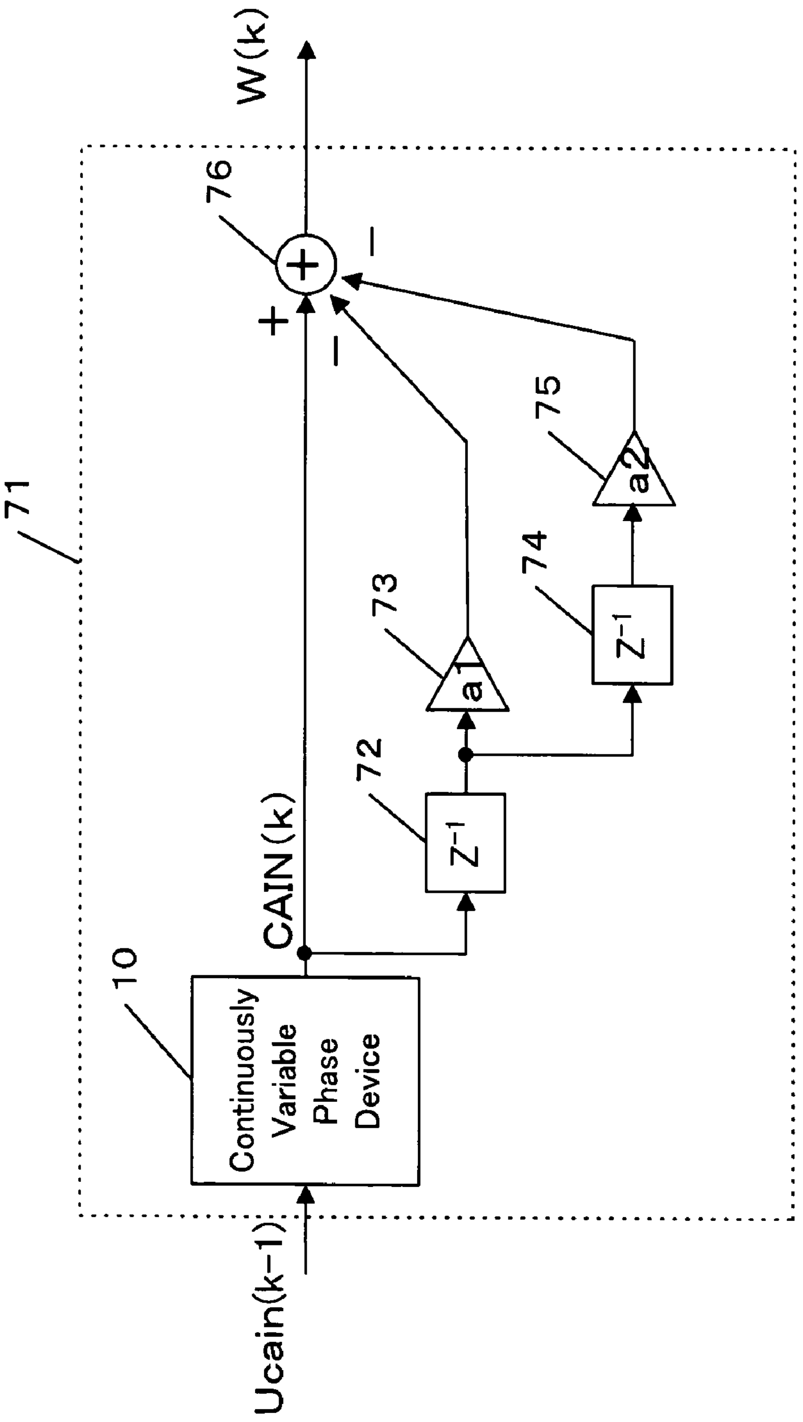
FIG. 7 is a block diagram showing a structure of a virtual plant for a partial identification algorithm in accordance with one embodiment of the present invention.

W(k) shown in the equation (13) can be regarded as an output of the virtual plant 71 as shown in FIG. 7. The output of the virtual plant 71 is obtained by subtracting from the actual control output CAIN both of a value that is calculated by multiplying the model parameter a1 by CAIN(k−1) which is obtained by delaying the control output CAIN by a delay element 72, and a value that is calculated by multiplying the model parameter a2 by a delayed value CAIN(k−2) which is obtained by delaying CAIN(k−1) by a delay element 74. The equation (14) can be regarded as a model expression of the virtual plant 71. If there is no modeling error, the output W(k) of the virtual plant 71 matches the output W_hat(k) of the model of the virtual plant 71.

The partial model parameter identifier 51 identifies the model parameters b1, b2 and c1 that appear in the model expression (14) of the virtual plant 71 by using a recursive identification algorithm.

The recursive identification algorithm is expressed as shown in the equation (15). A model parameter vector θ(k) is calculated in accordance with this algorithm.

$$\theta(k)=\theta(k-1)+KP(k)\cdot E\_id(k) \quad (15)$$

$$\text{where } \theta^T(k)=[b1(k), b2(k), c1(k)] \quad (16)$$

The model parameter vector θ(k) is calculated so that a modeling error E_id(k) expressed by the equation (17) is eliminated, in other words, the output W(k) of the virtual plant 71 converges to the output W_hat(k) of the model of the virtual plant 71.

$$\text{E\_id}(k) = W(k) - \text{W\_hat}(k) \quad (17)$$

where $$W(k) = CAIN(k) - a1\cdot CAIN(k-1) - a2\cdot CAIN(k-2)$$

$$\text{W\_hat}(k) = \theta^T(k)\cdot\zeta(k) = b1(k)\cdot Ucain(k-1) + b2(k)\cdot Ucain(k-2) + c1(k)$$

$$\zeta^T(k) = [Ucain(k-1),\ Ucain(k-2),\ 1]$$

KP(k) indicates a gain coefficient vector, which is defined by the equation (18). P(k) in the equation (18) is calculated in accordance with the equation (19).

$$KP(k) = \frac{P(k-1)\cdot\zeta(k)}{1+\zeta^T(k)\cdot P(k-1)\cdot\zeta(k)} \quad (18)$$

$$P(k) = \frac{1}{\lambda 1}\left(I - \frac{\lambda 2\cdot P(k-1)\cdot\zeta(k)\cdot\zeta^T(k)}{\lambda 1+\lambda 2\cdot\zeta^T(k)\cdot P(k-1)\cdot\zeta(k)}\right)P(k-1) \quad (19)$$

wherer I is a unit matrix of (3×3).

Depending on the values of λ1 and λ2, the type of the identification algorithm in accordance with the equations (15) to (19) is determined as follows:

λ1=1 and λ2=0: fixed gain algorithm
λ1=1 and λ2=1: least squares algorithm
λ1=1 and λ2=λ: decreasing gain algorithm (λ is a predetermined value other than 0 and 1)
λ1=λ and λ2=1: weighted least squares algorithm (λ is a predetermined value other than 0 and 1).

A delta-sigma modulation implemented by the delta-sigma modulator 54 will be described referring to FIG. 8. The delta-sigma modulator 54 generates the input Ucain into the controlled object so that the waveform of the output CAIN of the controlled object is coincident with the waveform of the reference input Rcain.

A limiter 81 performs a limiting process upon the reference input signal Rcain calculated by the sliding mode controller 53 as shown in the equation (20). For example, the reference input Rcain is limited in a range between a minimum value (for example, −12V) and a maximum value (for example, +12V) by the function Lim( ). An offset value Ucain_oft (for example, 0.5V) is subtracted from the output signal r1 of the limiter 81 as shown in the equation (21).

$$r1(k)=Lim(Rcain(k)) \quad (20)$$

$$r2(k)=r1(k)-Ucain\_oft \quad (21)$$

As shown in the equation (22), a subtractor 83 calculates a difference δ(k) between the signal r2(k) and the modulation signal u"(k−1) that is delayed by a delay element 85. An integrator 84 calculates an integral of the difference σ(k) by adding the difference δ(k) to the integral of the difference σ(k−1) that is delayed by a delay element 86, as shown in the equation (23). Then, a non-linear function unit 87 encodes the calculated integral of the difference σ(k) to output a modulation signal u"(k), as shown in the equation (24). The non-linear function unit 87 applies a non-linear function fnl( ) to the integral of the difference σ(k), as $$\delta(k)=r2(k)-u''(k-1) \quad (22)$$

$$\sigma(k)=\sigma(k-1)+\delta(k) \quad (23)$$

$$u''(k)=fnl(\sigma(k)) \quad (24)$$

$$fnl():\begin{cases}\sigma\ge 0\longrightarrow fnl(\sigma)=R\\ \sigma<0\longrightarrow fnl(\sigma)=-R\end{cases} \quad (25)$$

where R>maximum of |Rcain| shown in the equation (25). Specifically, the non-linear function unit 87 outputs a signal having a value of R if the integral of the difference σ(k) is equal to or greater than zero, and outputs a signal having a value of −R if the integral of the difference σ(k) is less than zero. Alternatively, the non-linear function unit 87 may output a signal having a value of zero when the integral of the difference σ is equal to zero. Here, R is set to have a value that is greater than a maximum absolute value which the reference signal Rcain is allowed to take.

An amplifier 88 amplifies the modulation signal u"(k) to output an amplified modulation signal u(k) as shown in the equation (26). Then, an offset value Ucain_oft (for example, 0.5V) is added to the amplified modulation signal u(k) to generate the control input Ucain as shown in the equation (27). KDSM" in the equation (26) is a gain for adjusting the amplitude of the amplified modulation signal u (for example, KDSM"=8).

$$u(k)=KDSM''\cdot u''(k) \quad (26)$$

$$Ucain(k)=Ucain\_oft+u(k) \quad (27)$$

The limiter 81 is provided in the delta-sigma modulator 54 in accordance with the embodiment of the present invention by the following reason. If the limiting process is not applied to the reference signal Rcain when the absolute value of the reference signal Rcain has a value of one or more, a dead time may occur from the time at which the reference signal Rcain changes from a positive value to a negative value (or from a negative value to a positive value) to the time at which the modulation signal u" is inverted in response to such change of Rcain. Such dead time can be suppressed by performing the limiting process by the limiter 81.

Figure 9:
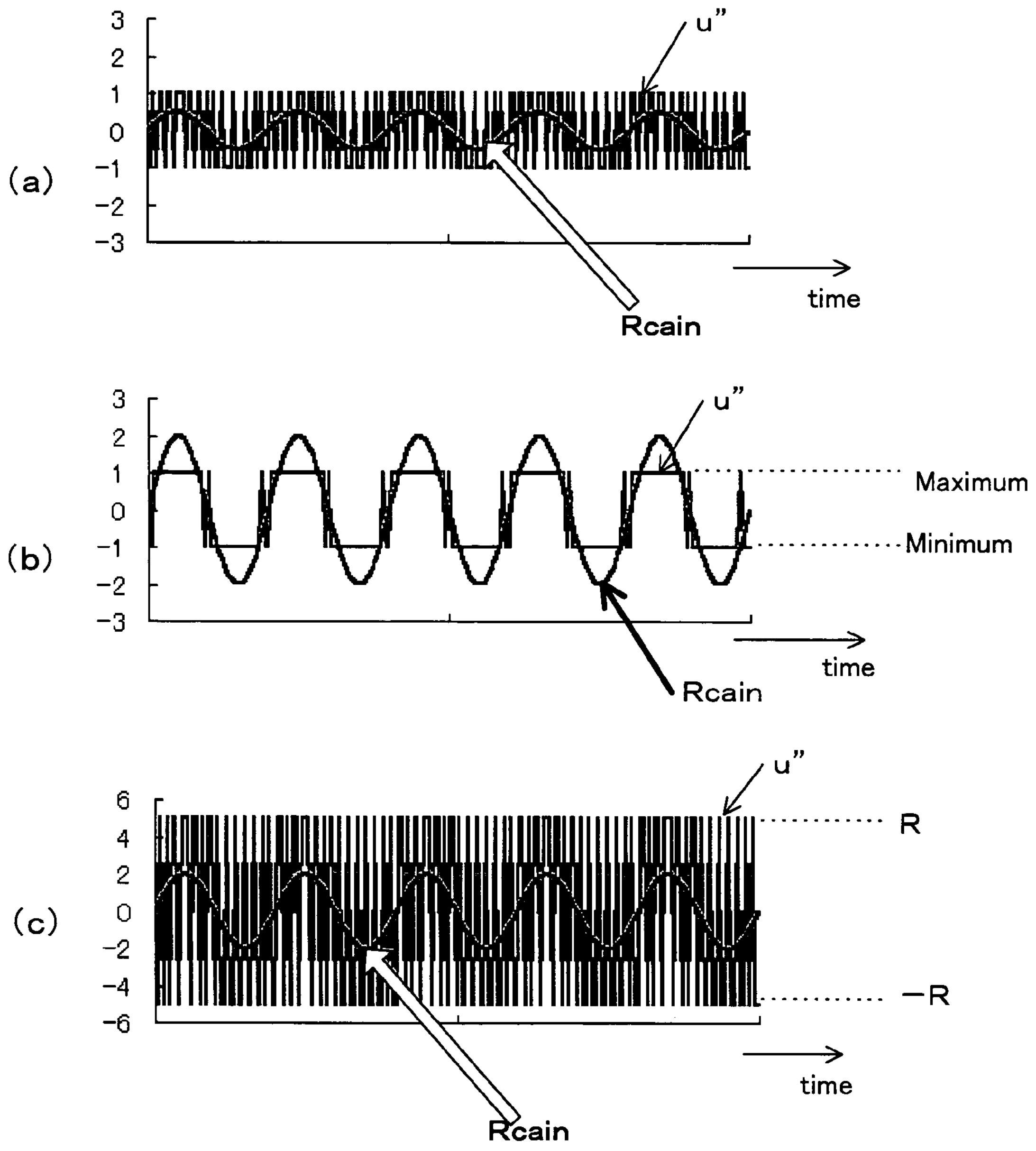
FIG. 9 shows an effect of preventing holding of a modulation signal in a delta-sigma modulator in accordance with one embodiment of the present invention.

The reason that the non-linear function unit for outputting a value of +R or −R is provided instead of a sign function that outputs 1 or −1 is as follows. Here, it is assumed that the above described limiter is introduced to a delta-sigma modulator that comprises a sign function. In the case where the reference signal Rcain is not limited by the limiter (that is, |Rcain|<1), the modulation signal u" as shown in FIG. 9(*a*) is output with control accuracy maintained. However, in the case where the reference signal Rcain is limited by the limiter (that is, |Rcain|≧1), the modulation signal u" that is held to a maximum value or a minimum value as shown in FIG. 9(*b*) is output. When the frequency that the signal is held to the maximum or minimum value is high, the control accuracy may deteriorate. Such holding occurs because the reference value Rcain exceeds the absolute value (that is, a value of one) of the modulation signal u" that is fed back to the subtractor 83. Thus, in the present embodiment, the non-linear function fnl( ) is introduced so that the absolute value of the modulation signal u" does not have a value of one but has a value R larger than the maximum value that the reference signal is allowed to take. Holding of the modulation signal u" is avoided even when the absolute value of the reference signal Rcain is equal to or greater than one, as shown in FIG. 9(*c*).

Figure 10:
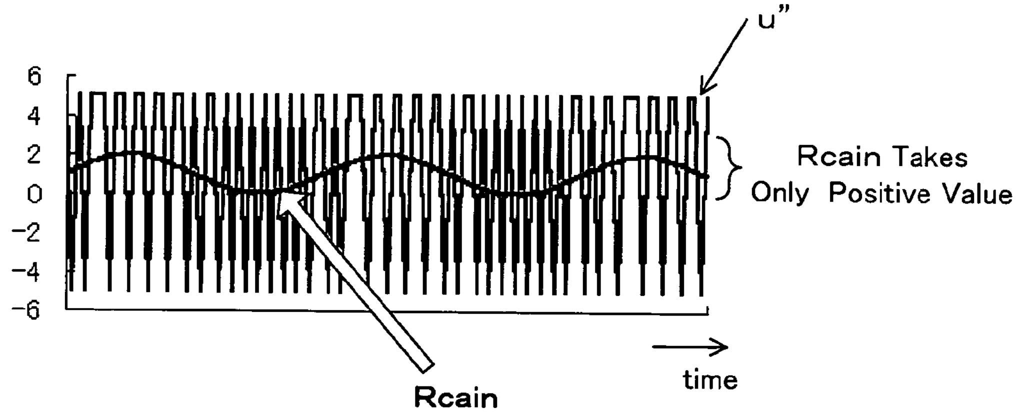
FIG. 10 shows an effect generated by applying an offset value to a reference input in a delta-sigma modulator in accordance with one embodiment of the present invention.
Figure 10:
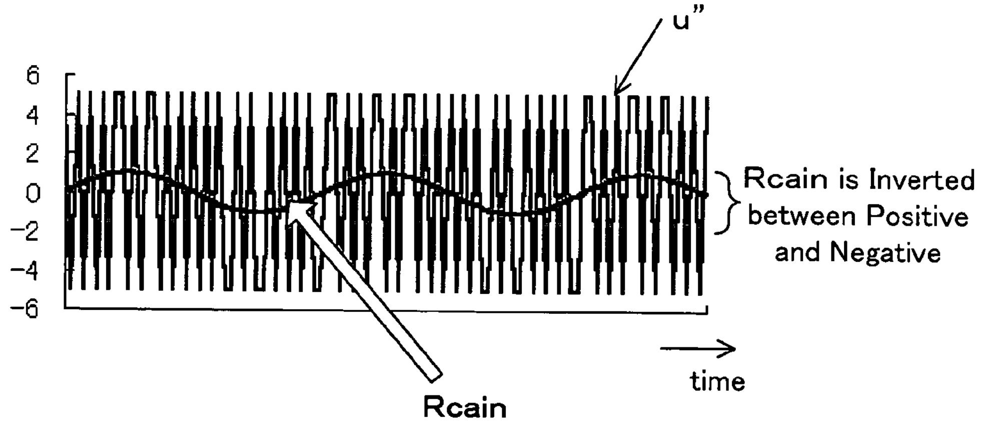

Furthermore, in the delta-sigma modulator 54 of the present embodiment, the reason that a subtracting/adding process of the offset value Ucain_of is introduced is as follows. In order to improve the control accuracy of the phase CAIN, it is preferable that the frequency that the control input Ucain is output as a maximum value and the frequency that the control input Ucain is output as a minimum value are almost the same (that is, 50% each). However, in fact, since the control input Ucain has a positive value, the reference input Rcain calculated by the sliding mode controller 53 has a positive value. As a result, the frequency that the modulation signal u" is output as a maximum value is higher as shown in FIG. 10(*a*).

Figure 8:
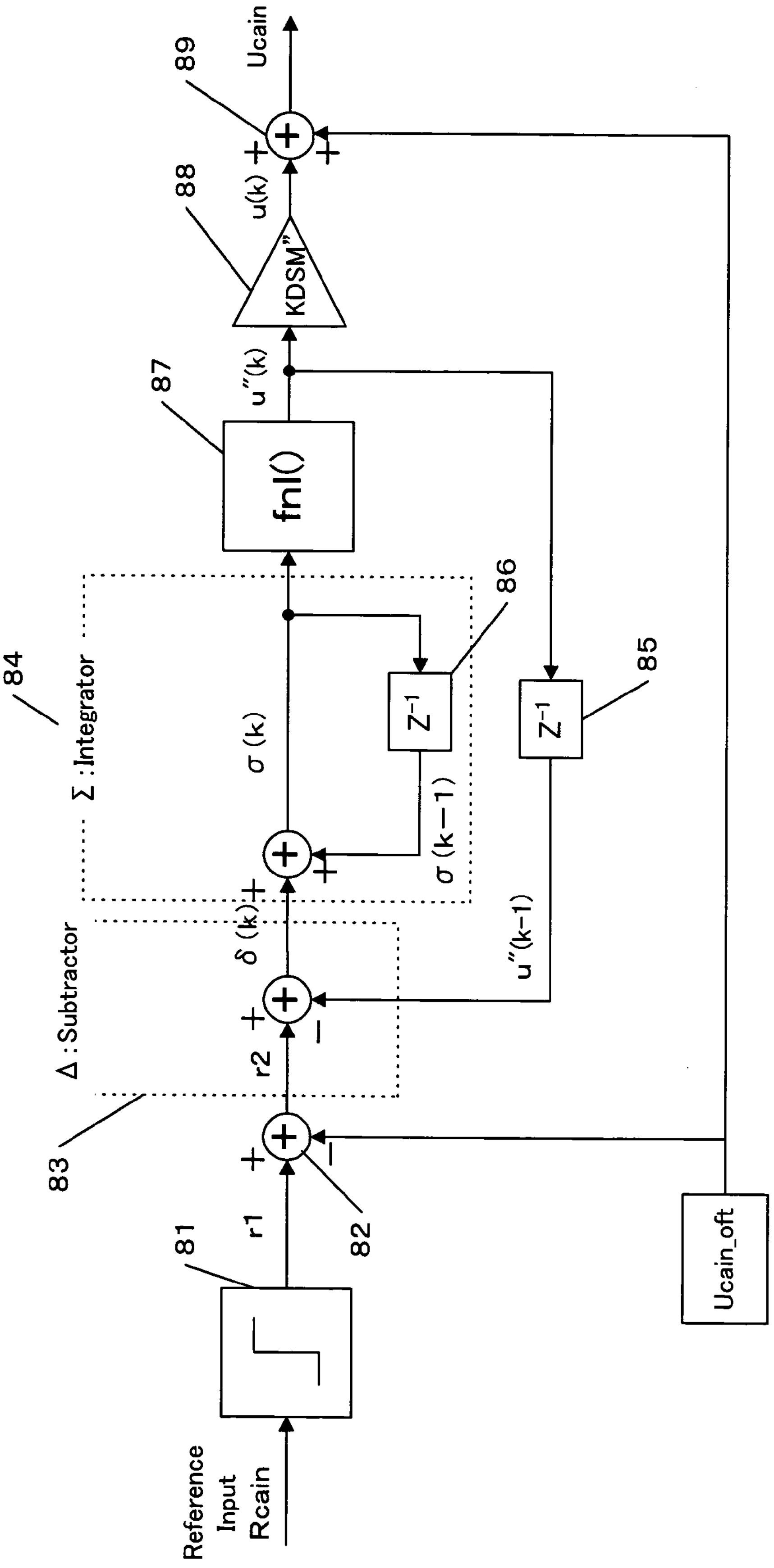
FIG. 8 is a block diagram showing a delta-sigma modulator in accordance with one embodiment of the present invention.

In order to solve this problem, in the present embodiment, as shown in the equation (21), a value that is obtained by subtracting the offset value Ucain_oft from the reference signal Rcain (more precisely, the signal r1 after the limiting process) is used as an input into the subtractor 83 (see the reference number 82 of FIG. 8). Thus, the frequency that the modulation signal u" is output as a maximum value and the frequency that the modulation signal u" is output as a minimum value can be almost the same as shown in FIG. 10(*b*). As shown in the equation (27), the offset value Ucain_oft is added when the actual control input Ucain is calculated (see the reference number 89 of FIG. 8).

Figure 11:
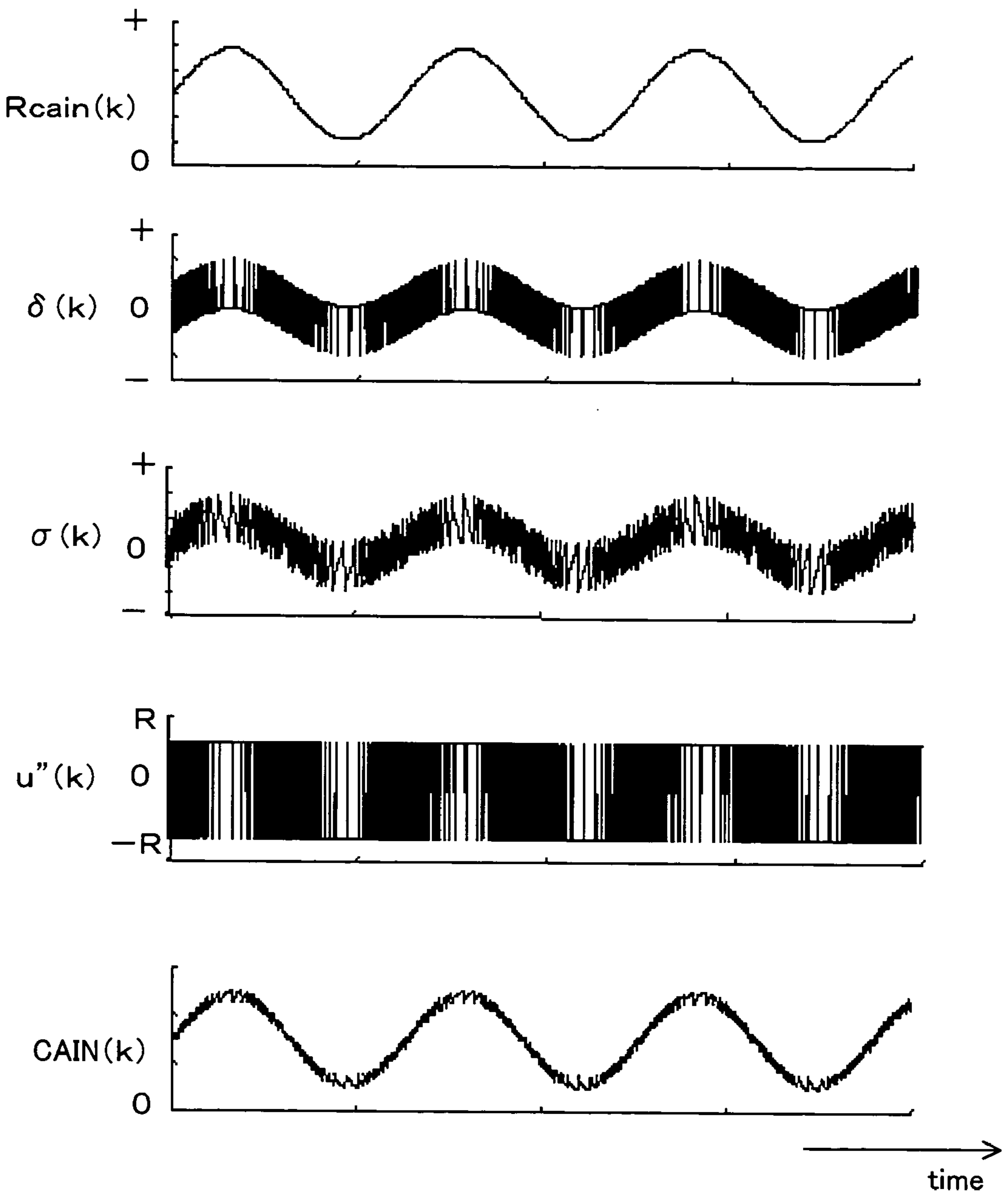
FIG. 11 shows an example of each signal wave in a delta-sigma modulator in accordance with one embodiment of the present invention.

FIG. 11 shows an example of a simulation result of the delta-sigma modulator 54 in accordance with one embodiment of the invention. When a sine wave reference signal Rcain is input into the modulator 54, a rectangular wave modulation signal u" is generated. By applying the signal Ucain based on the modulation signal u" to the controlled object, the output signal CAIN having the same frequency as the reference signal Rcain (but the amplitude may be different) may be output from the controlled object. Thus, the delta-sigma modulator 54 generates the modulation signal u" such that the waveform of the reference signal Rcain is reproduced in the output CAIN of the controlled object.

Control Flow

Figure 12:
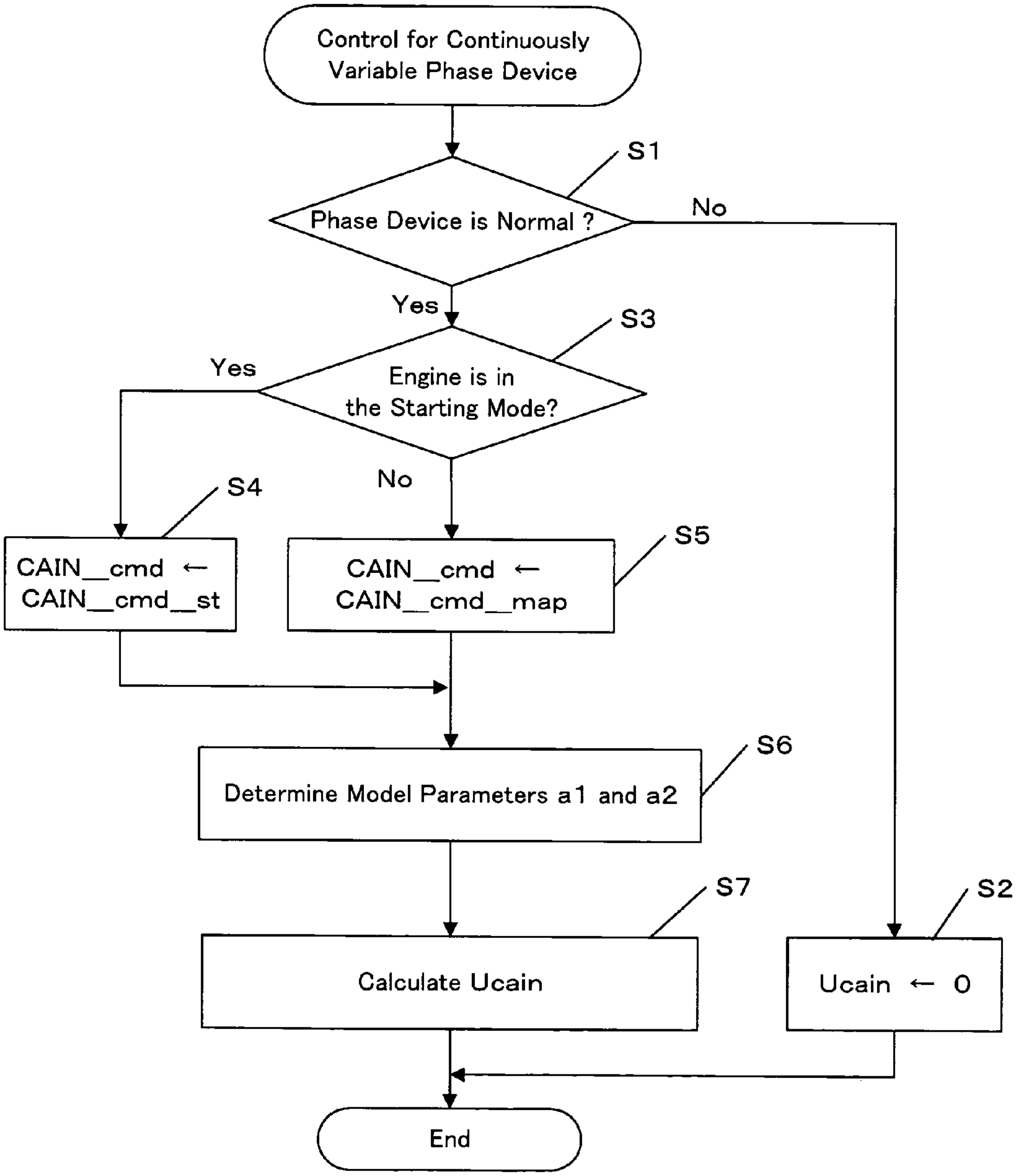
FIG. 12 shows a control flow in accordance with one embodiment of the present invention.

FIG. 12 is a flowchart of a control process in accordance with one embodiment of the present invention. This process is carried out at a predetermined time interval.

In step S1, it is determined whether the phase device 10 is normal. An abnormality (such as a failure etc.) of the phase device can be detected by using any appropriate technique. If an abnormality is detected in the phase device, the control input Ucain is set to zero in step S2. In this embodiment, the phase device is configured so that the actual phase CAIN of the intake camshaft is most retarded when the control input Ucain is zero.

If it is determined in step S1 that the phase device 10 is normal, it is determined whether the engine is in the starting mode (S3). If the engine is in the starting mode, a predetermined value CAIN_cmd_st is set in the desired value CAIN_cmd in step S4. The predetermined value CAIN_cmd_st is set to be slightly advanced (for example, about 10 degrees assuming that the most retarded phase is zero degree) so as to improve in-cylinder flow.

Figure 13:
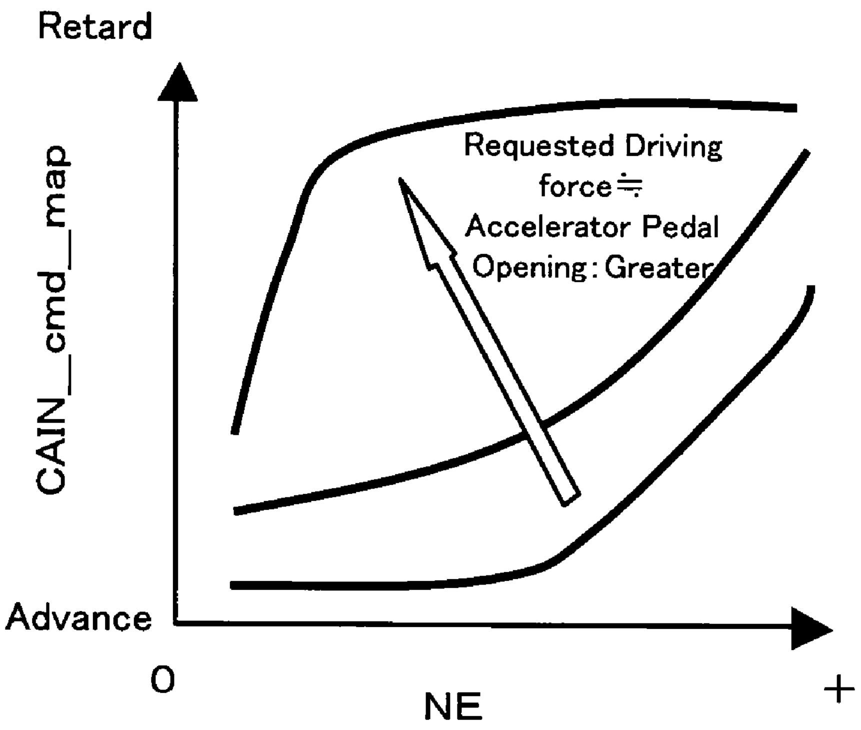
FIG. 13 shows a map to be used for determining a desired value for a phase of a camshaft in accordance with one embodiment of the present invention.

If the engine is not in the starting mode, a map is referred to based on the engine rotational speed NE to determine the desired value CAIN_cmd in step S5. An example of the map is shown in FIG. 13. As the rotational speed NE is higher, the desired value CAIN_cmd is set to be more retarded. Furthermore, as the requested driving force (which is typically represented by the opening angle of the accelerator pedal) increases, the desired value CAIN_cmd is set to be more retarded. In this embodiment, when the engine load is low, the driving force of the engine is decreased by causing the combustion of gas remaining in the cylinder. Therefore, when the engine load is low, the phase CAIN is set to be advanced. As the phase is set to be more advanced, the overlapping time during which both of the exhaust and intake valves are open is longer, increasing the remaining gas used for the combustion.

Figure 14:
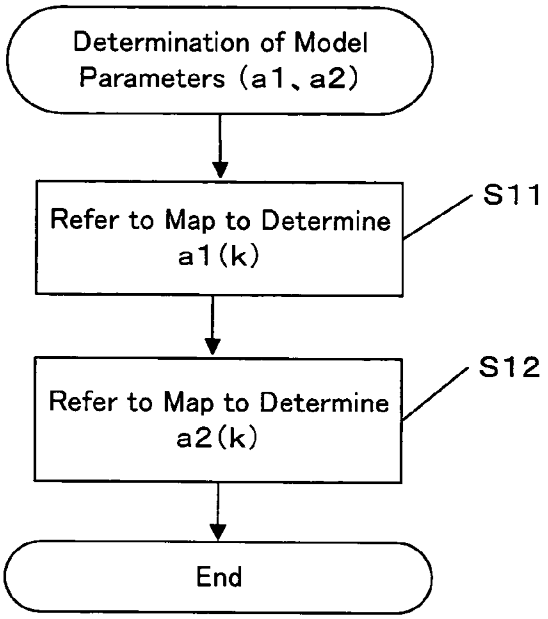
FIG. 14 shows a flowchart for determining model parameters by a model parameter scheduler in accordance with one embodiment of the present invention.

In step S6, the model parameter scheduler 52 performs a subroutine shown in FIG. 14 to determine the model parameters a1 and a2. In step S7, the partial model parameter identifier 51, the sliding mode controller 53 and the delta-sigma modulator 54 perform the above-described processes to determine the control input Ucain.

Figure 15:
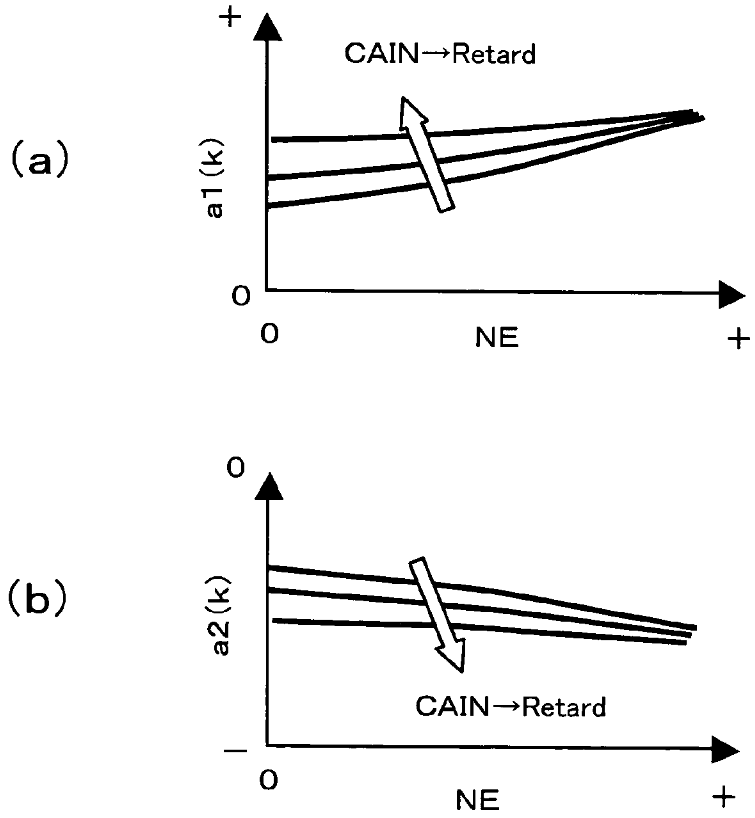
FIG. 15 shows maps for determining model parameters a1 and a2 in accordance with one embodiment of the present invention.

FIG. 14 shows a process for determining the model parameters a1 and a2. In step S11, a map is referred to based on the engine rotational speed NE to determine the model parameter a1. An example of the map is shown in FIG. 15(*a*). As the engine rotational speed NE increases, the model parameter a1 is set to increase. As the phase CAIN is more retarded, the model parameter a1 is set to increase.

In step S12, a map is referred to based on the engine rotational speed NE to determine the model parameter a2. An example of the map is shown in FIG. 15(*b*). As the engine rotational speed NE increases, the model parameter a2 is set to decrease. As the phase CAIN is more retarded, the model parameter a2 is set to decrease.

Another Embodiment

Figure 16:
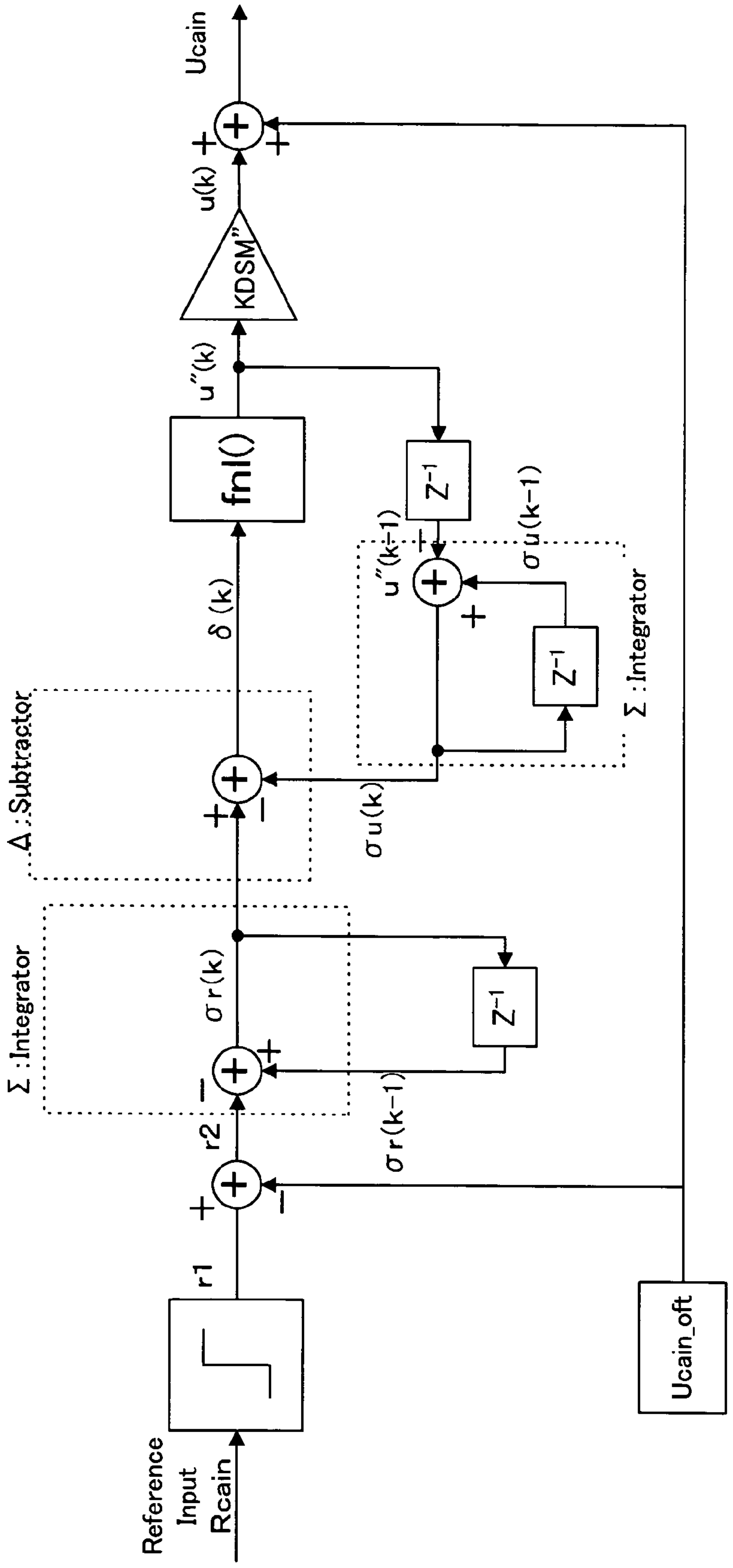
FIG. 16 is a block diagram of a sigma-delta modulator in accordance with one embodiment of the present invention.

In an alternative embodiment, a sigma-delta modulation algorithm or a delta modulation algorithm may be used instead of the delta-sigma modulation algorithm. A block diagram of a modulator using the sigma-delta modulation algorithm is shown in FIG. 16. Operations performed by the sigma-delta modulation algorithm are shown in the equations (28) to (35). A non-linear function in this alternative embodiment is the same as described above.

$$r1(k)=Lim(R\text{cain}(k)) \tag{28}$$

$$r2(k)=r1(k)-U\text{cain\_oft} \tag{29}$$

$$\sigma r(k)=\sigma r(k-1)-r2(k) \tag{30}$$

$$\sigma u(k)=\sigma u(k-1)-u''(k-1) \tag{31}$$

$$\delta(k)=\sigma r(k)-\sigma u(k) \tag{32}$$

$$u''(k)=fnl(\delta(k)) \quad (33)$$

$$u(k)=KDSM''\cdot u''(k) \quad (34)$$

$$Ucain(k)=Ucain\_oft+u(k) \quad (35)$$

Figure 17:
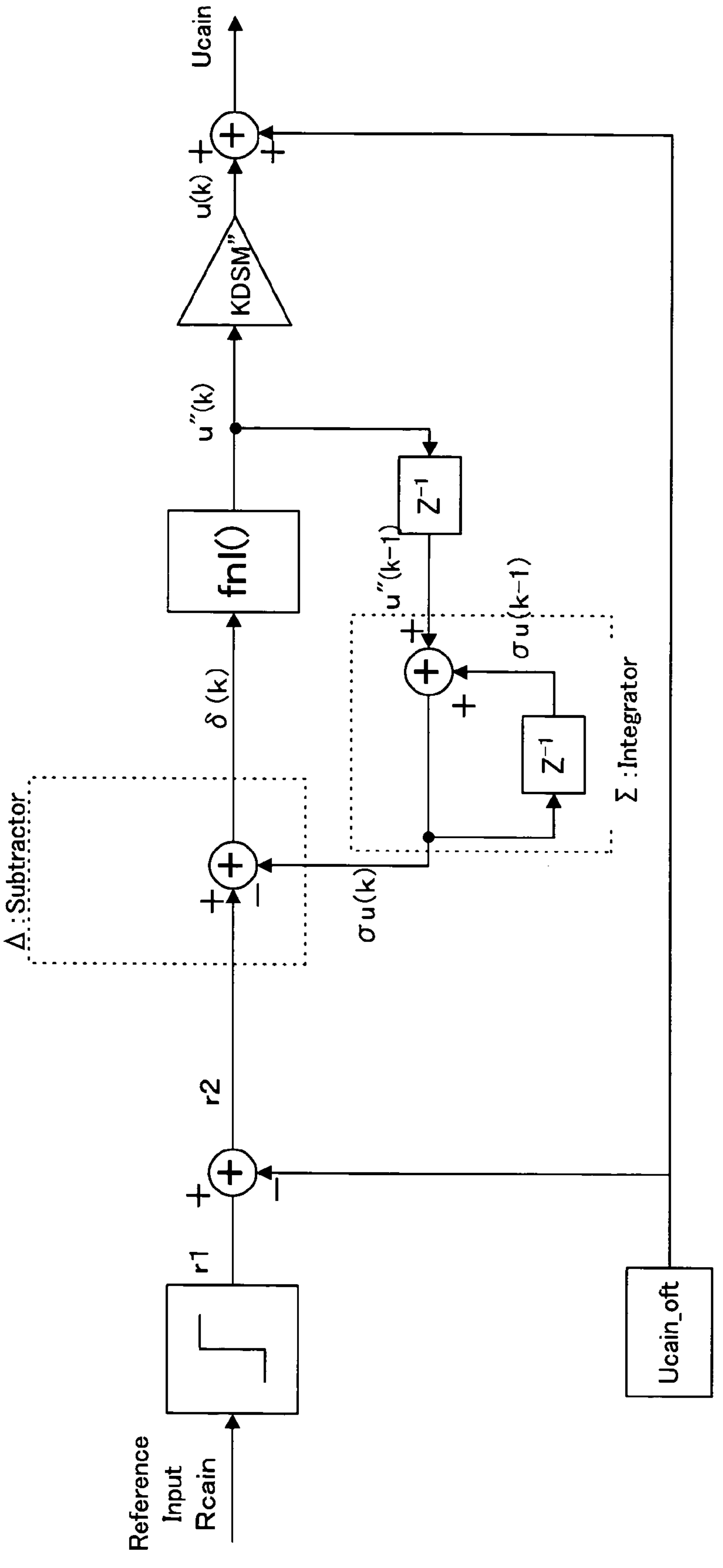
FIG. 17 is a block diagram of a delta modulator in accordance with one embodiment of the present invention.

A block diagram of a modulator using the delta modulation algorithm is shown in FIG. 17. Operations performed by the delta modulation algorithm are shown in the equations (36) to (42).

$$r1(k)=Lim(Rcain(k)) \quad (36)$$

$$r2(k)=r1(k)-Ucain\_oft \quad (37)$$

$$\sigma u(k)=\sigma u(k-1)+u''(k-1) \quad (38)$$

$$\delta(k)=r2(k)-\sigma u(k) \quad (39)$$

$$u''(k)=fnl(\delta(k)) \quad (40)$$

$$u(k)=KDSM''\cdot u''(k) \quad (41)$$

$$Ucain(k)=Ucain\_oft+u(k) \quad (42)$$

The preferred embodiments have been described above. The phase of the exhaust camshaft can be controlled in a similar manner to the phase of the above-described intake camshaft.

A response assignment control other than the 2-degree-of-freedom sliding mode control may be used.

The control technique in accordance with the present invention can be applied to any other various controlled objects. In one embodiment, the control technique in accordance with the present invention can be applied to a control of an air/fuel ratio of the engine. In this case, a controlled object may be a system from the engine to an exhaust gas sensor (for example, the O2 sensor shown in FIG. 1) that is disposed in the exhaust manifold for detecting an oxygen concentration of exhaust gas. A parameter associated with fuel to be supplied to the engine may be a control input and the output of the sensor may be a control output. An appropriate air/fuel control can be implemented by controlling the fuel supply to the engine so that the sensor output converges to a desired value.

The present invention can be applied to a general-purpose engine (for example, an outboard motor).

What is claimed is:

1. A control apparatus for controlling an object that is modeled using at least one model parameter, comprising:

an identifier for identifying the model parameter;

a controller coupled to the identifier, the controller determining a reference input using the model parameter so that an output of the object converges to a desired value; and a modulator coupled to the controller, the modulator applying any one of a delta-sigma modulation algorithm, a sigma-delta modulation algorithm and a delta modulation algorithm to the reference input to determine an input into the object, wherein the identifier identifies the model parameter based on the output of the object and the reference input.

2. The control apparatus of claim 1, wherein the object is modeled using at least two model parameters;

wherein the model parameters include a first model parameter that is pre-identified and a second model parameter that is identified by the identifier, wherein the identifier is further configured to:

model a virtual plant using the second model parameter, the virtual plant including the object and components that are associated with the first model parameter; and identify the second model parameter so that an actual output of the virtual plant converges to an output of the virtual plant modeled using the second model parameter.

3. The control apparatus of claim 1, wherein the model parameters include a model parameter that represents disturbance applied to the object, wherein the identifier is further configured to identify the model parameter that represents the disturbance based on the output of the object and the reference input.

4. The control apparatus of claim 1, wherein the object is modeled using at least two model parameters;

wherein the model parameters include a first model parameter that is pre-identified corresponding to a predetermined parameter, and a second model parameter that is recursively identified, wherein the control apparatus further comprises a parameter scheduler for holding the pre-identified first model parameter, wherein the parameter scheduler is further configured to:

receive the predetermined parameter; and determine the first model parameter corresponding to the received parameter.

5. The control apparatus of claim 1, wherein the controller determines the reference input using a 2-degree-of-freedom response assignment control algorithm.

6. The control apparatus of claim 1, wherein the object is a variable phase apparatus for variably controlling a phase of a camshaft of an engine, wherein the input into the object is a command to be supplied to the variable phase device, and the output of the object is the phase of the camshaft.

7. The control apparatus of claim 1, wherein the object is a system from an engine to an exhaust gas sensor disposed in an exhaust manifold of the engine, wherein the input into the object is a parameter associated with fuel to be supplied to the engine, and the output of the object is an output of the exhaust gas sensor.

8. A method for controlling an object that is modeled using at least one model parameter, comprising the steps of:

identifying the model parameter;

determining a reference input using the model parameter so that an output of the object converges to a desired value; and applying any one of a delta-sigma modulation algorithm, a sigma-delta modulation algorithm and a delta modulation algorithm to the reference input to determine an input into the object, wherein the model parameter is identified based on the output of the object and the reference input.

9. The method of claim 8, wherein the object is modeled using at least two model parameters, wherein the model parameters include a first model parameter that is pre-identified and a second model parameter that is identified by the identifier, wherein the method further comprises the steps of:

modeling a virtual plant using the second model parameter, the virtual plant including the object and components that are associated with the first model parameter; and identifying the second model parameter so that an actual output of the virtual plant converges to an output of the virtual plant modeled using the second model parameter.

10. The method of claim 8, wherein the model parameters include a model parameter that represents disturbance applied to the object, wherein the method further comprises the step of identifying the model parameter that represents the disturbance based on the output of the object and the reference input.

11. The method of claim 8, wherein the object is modeled using at least two model parameters, wherein the model parameters include a first model parameter that is pre-identified corresponding to a predetermined parameter, and a second model parameter that is recursively identified, wherein the method further comprises the step of determining the first model parameter corresponding to the received parameter in response to a receipt of the predetermined parameter.

12. The method of claim 8, further comprising the step of using a 2-degree-of-freedom response assignment control algorithm to determine the reference input.

13. The method of claim 8, wherein the object is a variable phase apparatus for variably controlling a phase of a camshaft of an engine, wherein the input into the object is a command to be supplied to the variable phase device, and the output of the object is the phase of the camshaft.

14. The method of claim 8, wherein the object is a system from an engine to an exhaust gas sensor disposed in an exhaust manifold of the engine, wherein the input into the object is a parameter associated with fuel to be supplied to the engine, and the output of the object is an output of the exhaust gas sensor.

15. An apparatus for controlling an object that is modeled using at least one model parameter, comprising:

means for identifying the model parameter;

means for determining a reference input using the model parameter so that an output of the object converges to a desired value; and means for applying any one of a delta-sigma modulation algorithm, a sigma-delta modulation algorithm and a delta modulation algorithm to the reference input to determine an input into the object, wherein the model parameter is identified based on the output of the object and the reference input.

16. The apparatus of claim 15, wherein the object is modeled using at least two model parameters, wherein the model parameters include a first model parameter that is pre-identified and a second model parameter that is identified by the identifier, wherein the means for identifying means further comprises:

means for modeling a virtual plant using the second model parameter, the virtual plant including the object and components that are associated with the first model parameter; and means for identifying the second model parameter so that an actual output of the virtual plant converges to an output of the virtual plant modeled using the second model parameter.

17. The apparatus of claim 15, wherein the model parameters include a model parameter that represents disturbance applied to the object, wherein the means for identifying further comprises means for identifying the model parameter that represents the disturbance based on the output of the object and the reference input.

18. The apparatus of claim 15, wherein the object is modeled using at least two model parameters, wherein the model parameters include a first model parameter that is pre-identified corresponding to a predetermined parameter, and a second model parameter that is recursively identified, wherein the apparatus further comprises means for holding the pre-identified first model parameter, wherein the means for identifying further comprises:

means for receiving the predetermined parameter; and means for determining the first model parameter corresponding to the received parameter.

19. The apparatus of claim 15, wherein the means for determining further comprises means for using a 2-degree-of-freedom response assignment control algorithm to determine the reference input.

20. The apparatus of claim 15, wherein the object is a variable phase apparatus for variably controlling a phase of a camshaft of an engine, wherein the input into the object is a command to be supplied to the variable phase device, and the output of the object is the phase of the camshaft.

21. The apparatus of claim 15, wherein the object is a system from an engine to an exhaust gas sensor disposed in an exhaust manifold of the engine, wherein the input into the object is a parameter associated with fuel to be supplied to the engine, and the output of the object is an output of the exhaust gas sensor.

* * * * *